Sept. 28, 1965 G. SONDER 3,208,217
TURBINE ENGINE AND GEARBOX MOUNTING ARRANGEMENT
Filed Aug. 28, 1964
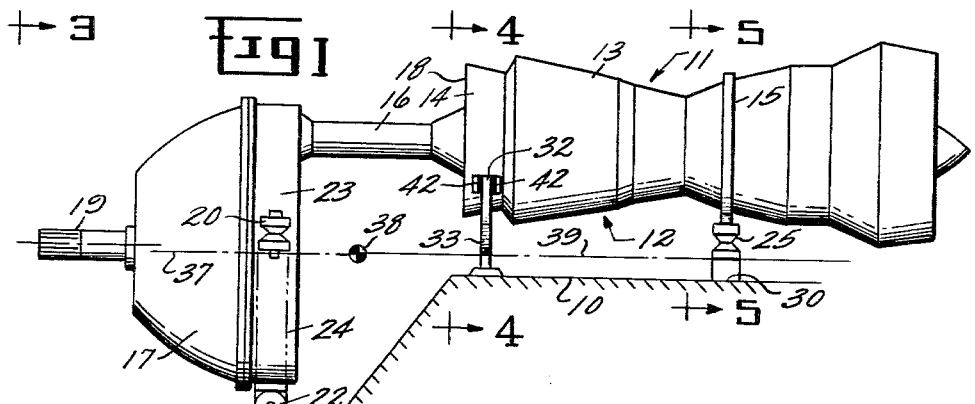
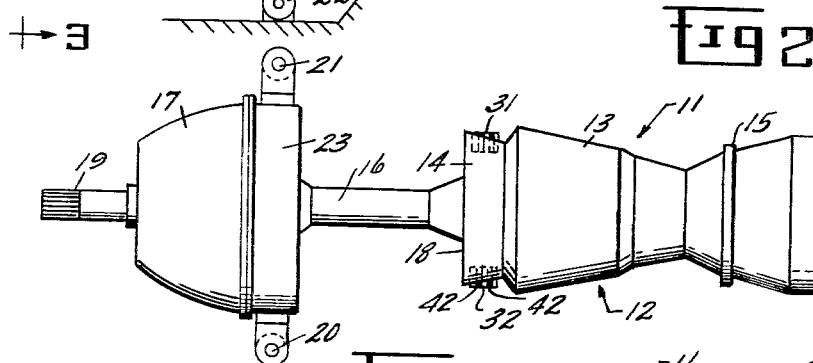
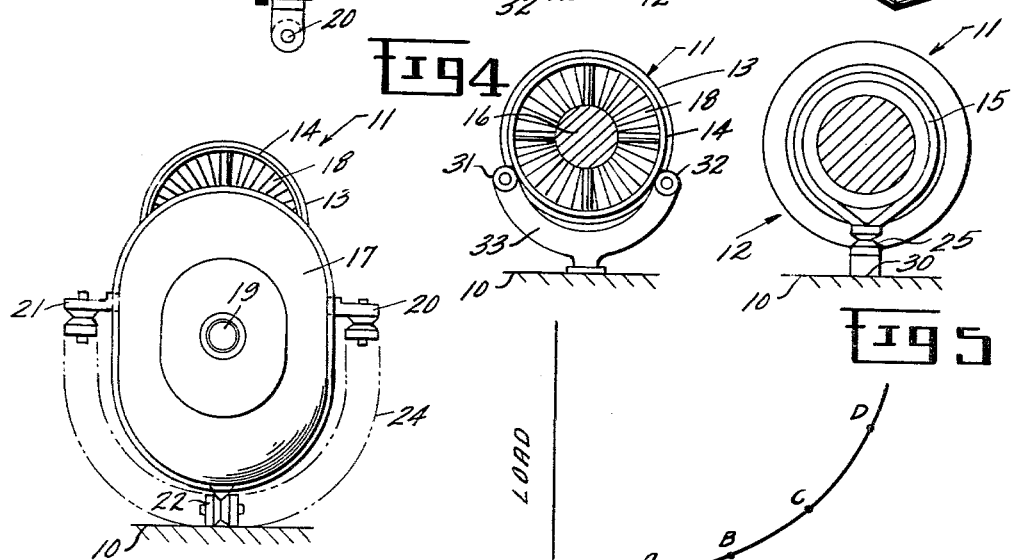
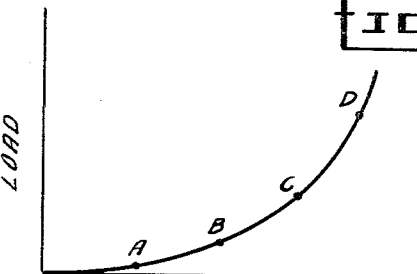
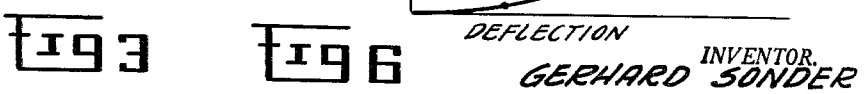
INVENTOR.
GERHARD SONDER
BY
George R. Powers
ATTORNEY United States Patent Office 3,208,217
Patented Sept. 28, 1965

3,208,217
TURBINE ENGINE AND GEARBOX MOUNTING ARRANGEMENT
Gerhard Sonder, Manchester, Mass., assignor to General Electric Company, a corporation of New York
Filed Aug. 28, 1964, Ser. No. 392,884
5 Claims. (Cl. 60—39.31)

This application is a continuation-in-part of the applicant's now abandoned, prior copending application entitled, "Turbine Engine and Gearbox Mounting Arrangement," Serial No. 141,656, filed September 29, 1961, and assigned to the assignee of this invention.

This invention relates to a mounting arrangement for a turbine engine and gearbox assembly and, more particularly, to a mounting arrangement for a turbine engine and gearbox assembly such as a turboprop engine in which the engine and the gearbox are structurally connected and mounted as an integral unit.

As is well known in the art, the typical turboprop engine assembly includes a speed reduction gearbox associated with the engine for reducing the relatively high output speed of the engine to the lower speed required by the propeller. In the past, it has been typical practice to mount the engine and the gearbox as separate elements in the airframe, the mounting means for each being completely independent of the other. In such an installation, the engine is connected in driving relationship with the gearbox through a suitable flexible coupling designed to accommodate any misalignment that might occur. More recently, however, with the turboprop engine comprising both the turbine and the gearbox typically designed and supplied by the engine manufacturer as a single functional unit, it has become a common practice to form the engine and its gearbox as a single structural unit as well, this integral assembly being mounted in the airframe as a single unit rather than as independent units connected by a flexible coupling. This permits handling of the powerplant as a single element and it allows certain advantages in the way of factory assembly and adjustment which are more difficult to obtain where the engine and gearbox are mounted as separate units.

This single unit mounting approach presents, however, certain problems which will, it is believed, be best understood in light of a brief discussion of the laws of statics as applied to engine mounting systems. It is basic that the mounting arrangement which connects the powerplant to the airframe must be capable of securely supporting the powerplant under all operating conditions. To accomplish this, the mounting arrangement must be such that the laws of statics relative to the summation of forces and moments in three principal directions are satisfied. These principles are usually stated as $\Sigma F=0$ and $\Sigma M=0$. Thus, in order to maintain the powerplant in equilibrium, the mounting arrangement must be capable of developing reaction forces and moments in three principal directions to counteract forces and moments acting on the powerplant. It is well known that the laws of statics may be satisfied by six suitable restraints such as forces of suitable direction, magnitude, and separation acting through suitably spaced support points, usually three in number. Any reaction forces in addition to those actually needed may produce what is known as a statically indeterminate or redundant structure. Such a structure increases the complexity of the mounting arrangement and the possibility of reduced performance or damage due to unforeseen distortion since adjustment to relieve strains is more difficult.

These considerations apply with respect to both the multiple and single unit mounting approaches described above. Thus, where the turbine engine and the gearbox are independently mounted, it is typical to use a three-point, six-reaction-force mounting arrangement for each, especially the engine which, because of its inherently more flexible structure, is particularly susceptible to undesired distortion caused by redundant loading. Similarly, in an integral arrangement where the gearbox and the turbine engine are connected by means of a substantially rigid structure, the integral assembly is typically mounted by means of a three-point, six-reaction-force arrangement. A typical arrangement is a three-point suspension system in which two mounts are located on horizontally opposite sides of the gearbox and a third mount is located at the top or bottom of the engine about halfway along its length. In this type of suspension, the engine mount will generally be selected to permit freedom of movement in the axial direction to allow for growth due to thermal expansion.

It will be observed that while in such a single unit mounting approach the integral assembly is capable of absorbing the full range of loads which are imposed, neither the engine nor the gearbox is capable individually of absorbing the full range of loads since neither is mounted on the airframe as a completely separate entity. Thus, a failure in the substantially rigid interconnecting structure between the engine and the gearbox, to utilize this as an example, would leave the engine free to swing about its single mount, with the possibility of a catastrophic failure as a result. It should also be observed that the gearbox must absorb a variety of loads in terms of propeller thrust and gyroscopic forces created by aircraft maneuvers. Where the gearbox and the engine are mounted as a single unit, there is a tendency for these loads to be transmitted back to the engine, placing bending moments on the engine structure and the interconnecting elements. While the interconnecting structure is sufficiently rigid to carry satisfactory normal loads, unusual loads such as those caused by improper handling of the aircraft or by severe weather conditions may result in excessive bending moments and deflections of the engine structure. Although extremely unusual, it will also be obvious that such loads could be sufficient to cause failure of the interconnecting structure and result in catastrophic failure as referred to above.

The obvious approach to these problems is to provide additional mounts on both the engine and the gearbox so that each is independently mounted on the airframe. But, with the engine and the gearbox already tied together as a single entity, this approach would lead to excessive redundancy in the mounting system which could result in distortion of the engine and severe stresses on both the engine and its mounting system due to deflections in the airframe structure during operation. It has thus been found to be unsatisfactory in practice to redundantly mount the engine and the gearbox both as an integrated assembly and as separate elements.

It is accordingly an object of this invention to provide an improved engine and gearbox mounting arrangement which has the advantages of both the separate element and the single unit mounting approaches.

Another object of this invention is to provide an improved engine and gearbox mounting arrangement which allows a single unit mounting approach to be followed, but which provides protection against failure of one or more of the mounts or of the interconnecting structure between the engine and the gearbox without forming a redundant arrangement imposing excessive loads on the engine as a result of airframe deflections.

A further object of this invention is to provide an improved mounting arrangement in which the bending moments imposed on the engine and the interconnecting structure by propeller thrust and maneuver loads are minimized.

Briefly stated, in accordance with the illustrated embodiment of the invention as applied to a turboprop engine, the turbine engine and the gearbox are joined to form a single power plant unit, preferably by means of a rigid torque tube enclosing the power output shaft and rigidly connected to both the engine and the gearbox. This interconnecting structure is sufficiently rigid to absorb normal loads and bending moments during operation without deflecting appreciably. For mounting this integral assembly in an airframe installation, three main mounts are located on the periphery of the gearbox through which the assembly is directly connected in a conventional manner to the airframe. Two of these mounts are positioned horizontally opposite each other on a line above the propeller axis, and the third is positioned below the propeller axis, preferably at the bottom of the gearbox. A fourth conventional main mount is positioned on the turbine engine, preferably either at the top or bottom of the engine, and is arranged such as to allow freedom of movement in the axial direction to allow for thermal expansion in the powerplant. The elastic center of the gearbox mount cluster is positioned to coincide as nearly as possible within practical design limits with the propeller rotational axis such that the propeller thrust forces produce almost pure translational deflection of the gearbox against its mounts to minimize the bending moment imposed on the torque tube. The elastic center of the entire system is positioned to coincide as closely as possible within practical design limits to the roll axis of the engine-gear-box assembly such that roll forces are absorbed substantially evenly on all the mounts.

In addition to the main mounting arrangement, a pair of auxiliary mounts are provided on the engine structure to provide essentially independent support of the engine in the event of failure of one of the main mounts or a failure in the interconnecting torque tube. As the main mounts, these auxiliary mounts connect the engine structure to the airframe, but unlike the main mounts the auxiliary mounts have a variable spring gradient characteristic such that they provide only negligible support in the normal deflection range of the mounting system. Thus, forces which would otherwise be imposed on the engine because of excessive redundancy in the mounting system are virtually eliminated. In the event of failure, however, of the kinds referred to above, the auxiliary mounts are deflected into a higher gradient region where they are capable of absorbing loads of the magnitude necessary to support the system. The mount arrangement of this invention thus combines the advantages of both the single unit and the separate elements mounting arrangements without introducing excessive redundancy into the system.

While the specification concludes with claims particularly pointing out and distinctly claiming the subject matter regarded as the invention, it is believed that the invention, together with further objects and advantages, may best be understood by reference to the following description taken in connection with the accompanying drawing in which:

FIG. 1 is a side view of a shaft turbine engine assembly and its associated airframe structure illustrating the mounting arrangement of this invention;

FIG. 2 is a plan view of the shaft turbine assembly shown by FIG. 1;

FIG. 3 is a front view of the engine assembly of FIG. 1 taken along viewing line 3—3;

FIG. 4 is a view taken along line 4—4 of FIG. 1;

FIG. 5 is a view taken along line 5—5 of FIG. 1; and

FIG. 6 is Load-Deflection Curve illustrating the variable spring gradient characteristic of the auxiliary mounts.

Referring to the drawings, and particularly to FIGS. 1 and 2, a portion of an airframe 10 having a shaft turbine engine assembly 11 mounted thereon is shown, the assembly 11 including a gas turbine engine 12 as a power unit. The engine 12 has an outer engine casing 13 including an engine front frame 14 and a rear frame 15. A torque tube 16 encloses an output drive shaft, not shown, and rigidly interconnects the engine 12 to an offset gearbox 17, the rigidity of the torque tube 16 being sufficient to absorb all normal loads between the gearbox 17 and the engine 12 without deflecting appreciably. The offset gearbox 17 permits a relatively unobstructed air flow to the air inlet region 18 of the shaft turbine engine 12. The gearbox 17 has a propeller shaft 19 extending from the gearbox 17 to drive any desired unit; for example, a propeller not shown.

The mounting arrangement of the present invention can best be understood by again referring to FIGS. 1 and 2 along with FIG. 3. Three main mounts 20–22 are provided on the periphery 23 of the gearbox 17 and are connected to the airframe 10 through a yoke 24. A fourth main mount 25 is located on the rear frame 15 of the engine 12 and is connected to the airframe 10 at 30. Two auxiliary mounts 31 and 32 are located on the front frame 14 of the engine 12, these auxiliary mounts being connected to the airframe 10 through a yoke 33. The main mounts 20–22 and 25 can be classified as relatively "stiff" mounts, while the two auxiliary mounts 31 and 32 can be classified as relatively "soft" mounts having a large change in spring gradient with increasing deflection which results in a "stiff" mount beyond certain normal deflections. The meaning of the terms "stiff" and "soft" will become clear as this specification proceeds.

In the present invention, the shaft turbine engine assembly 11 is supported from the airframe 10 through the main mounts 20–22 and 25 as an integral assembly. The main mounts are of the conventional type used for mounting aircraft powerplants and, as such, have the required amount of resilience to provide proper vibration isolation and a cushion against shock loads. More particularly, the three main mounts 20–22 on the periphery 23 of the gearbox 17 transmit the propeller thrust loads to the airframe, and the fourth main mount 25 provides vertical and lateral restraint of the assembly 11 in conjunction with the three mounts 20–22. The fourth main mount 25 does not, however, provide axial restraint of the engine assembly 11 since it is necessary to permit axial thermal growth of the engine 12 during operation. During normal operations of the shaft turbine engine assembly 11, the four main mounts 20–22 and 25 adequately support the assembly, the auxiliary mounts 31 and 32 contributing only negligible, if any, support. Thus, the engine structure is not subjected to excessively redundant forces during normal operation.

As pointed out above, the torque tube 16 is sufficiently rigid to absorb the normal bending moments transmitted between the gearbox 17 and the engine 12. These moments correlated to the maneuvers would be a yawing moment about a vertical axis, a pitching moment about a lateral axis, and a rolling moment about an axial axis. In accordance with this invention, the main mounts 20–22 and 25 are located so as to maintain these normal bending moments as small as practically possible. The mounts 20–22 on the gearbox periphery 23 are located such that the elastic axis 37 of the mounts 20–22 is located closely adjacent the axis of the propeller shaft 19. The elastic axis is defined as the axis along which an applied force will produce symmetrical loading and deflection of all of the mounts. Thus, with the propeller thrust load transmitted along the axis of the propeller shaft 19 and the elastic axis 37 located closely adjacent thereto, it will be obvious that the thrust loads will be absorbed in a substantially symmetrical manner by the gearbox mounts 20–22. This minimizes the bending forces which would otherwise be transmitted back through the torque tube 16 and the engine as a result of unsymmetrical deflection of the gearbox 17. The main mounts 20–22 and 25 are also located such that the elastic center 38 which may be defined as the point in the system about which symmetrical load absorption on all mounts occurs, is positioned closely adjacent the roll axis 39. The roll axis may be defined as the axis about which an elastically mounted engine would rotate if disturbed, the axis being substantially parallel to the longitudinal axis of the engine. Since the elastic center 38 falls substantially on the roll axis 39, roll forces caused by propeller torque are symmetrically absorbed by the mounts such that roll deflections are minimized.

In order to locate the elastic axis 37 of the gearbox mounts 20–22 and the elastic center 38 of the system in the manner described above, the first main mount 20 and the second main mount 21 are located on opposite sides of the gearbox periphery 23 and are in a horizontal plane parallel to and intermediate the axes of the propeller shaft 19 and the torque tube 16, the assembly 11 being in its normal upright position illustrated by FIGS. 1–3. The third main mount 22 is located on the gearbox periphery 23 at a circumferential point between the first and second main mounts and diametrically opposed to a circumferential point on the gearbox periphery 23 adjacent the torque tube 16. The fourth main mount 25 on the rear frame 15 of the engine 12 is positioned as closely as possible to the roll axis 39.

It has been pointed out above that the main mounts 20–22 and 25 adequately support the shaft turbine engine assembly 11 during normal operations and that the auxiliary mounts 31 and 32 do not contribute any substantial support. If, however, the bending moments transmitted through the torque tube 16 become excessive due to unusual aircraft maneuvers or failure of a main mount, or if the torque tube 16 itself should fail, the engine 12 would no longer be supported in a stable manner and would tend to deflect substantially from its normal position. The auxiliary mounts 31 and 32 are designed to absorb substantial loads in the event of such an occurrence. As best shown by FIG. 1, this is a accomplished by providing a layer 42 of resilient material such as rubber between the auxiliary mounts 31 and 32 and the yoke 33. The resilient material permits substantial deflections of the engine 12, and corresponding deflections in the layer 42, before greater than nominal forces are transmitted through the yoke 33. Before proceeding, it is pointed out that the resiliency of the auxiliary mounts 31 and 32 is much greater than the slight resiliency generally provided in conventional aircraft engine mounts such as the main mounts. Since the main mounts 20–22 and 25 load up much more quickly than the auxiliary mounts, they are referred to as "hard" mounts while the auxiliary mounts 31 and 32 are known as "soft" mounts.

The deflection characteristic of the auxiliary mounts 31 and 32 is shown by FIG. 4, which illustrates the relationship between the amount of engine deflection, and the amount of deflection of the layers 42 in the mounts, and the load transmitted through the auxiliary mounts. It will be observed that the spring gradient characteristic of the auxiliary mounts is variable. The point A on the curve represents a deflection of a magnitude which would normally occur in the frequent maneuver range. In relation to the loads absorbed by the main mounts, the loads absorbed by the auxiliary mounts 19 and 20 for a deflection of this magnitude are virtually negligible. Point B represents a deflection in the infrequent maneuver range, showing an increased contribution of the auxiliary mounts, but still not of sufficient magnitude to upset the overall load distribution pattern of the main mounting system. Point C represents a deflection of a magnitude occurring on failure of one of the main mounts, showing a material contribution of the auxiliary mounts, while point D represents a deflection of the magnitude which would occur upon a failure of the torque tube 16, a failure which would otherwise quite probably cause a catastrophic failure of the entire system. Over the range in the vicinity of point D, the auxiliary mounts act as hard or stiff mounts and perform a substantial support function, but in the ranges of points A and B do not add any significant redundancy to the system. The stresses in the engine and mounting system which would otherwise be produced by airframe deflections in an excessively redundant mounting system are thus avoided, while still retaining the advantages of redundancy for failures in the system.

It will thus be seen that the mounting arrangement of this invention is an improved system having the advantages of both the separate element and the single unit mounting approaches without being harmfully redundant during normal aircraft operation.

While preferred embodiments of this invention have been described, it will be obvious to those skilled in the art that various changes and modifications may be made without departing from the invention. For example, to provide added rigidity in the interconnecting structure between the gearbox and the engine, it may be desirable to utilize struts between the engine and the gearbox in addition to the rigid torque tube. It will also be obvious that means other than a layer of rubber can be utilized to provide the variable spring gradient characteristic of the auxiliary mounts.

Other changes and modifications will occur to those skilled in the art. It is therefore intended to cover in the appended claims all such changes and modifications as fall within the true spirit and scope of the invention.

What is claimed as new and desired to secure by Letters Patent of the United States is:

1. A shaft turbine engine and gearbox mounting arrangement comprising:
    (a) a turbine engine,
    (b) a gearbox,
    (c) an output drive shaft extending from said turbine engine drivingly connected to said gearbox,
    (d) a torque tube enclosing said output drive shaft and rigidly interconnecting said turbine engine and said gearbox,
    (e) a propeller shaft extending from the gearbox,
    (f) first, second, and third main mounts on said gearbox circumferentially spaced about the gearbox periphery,
    (g) a fourth main mount positioned on said turbine engine and providing flexibility of movement in the longitudinal direction to allow for thermal deflection in the system,
    (h) and first and second auxiliary mounts on said turbine engine,
    (i) the spring gradient characteristic of said auxiliary mounts relative to said main mounts being such as to provide a relatively soft mount characteristic in the normal deflection range and to provide a hard mount characteristic in deflection ranges of a magnitude representing a failure of one or more of said main mounts or of said torque tube,
    (j) said first and second auxiliary mounts being so positioned on said engine so as to be able to substantially carry an excess loading on the engine and gearbox due to a failure of any one of the main mounts or the rigid interconnection between the engine and gearbox.

2. A shaft turbine engine and gearbox mounting arrangement comprising:

(a) a turbine engine,
(b) a gearbox,
(c) an output drive shaft extending from said turbine engine and drivingly connected to said gearbox,
(d) a torque tube enclosing said output drive shaft and rigidly interconnecting said turbine engine and said gearbox,
(e) a propeller shaft extending from the gearbox and offset vertically from the axis of said output drive shaft,
(f) first and second main mounts positioned on said gearbox on opposite sides of a vertical plane extending through the axes of said output drive shaft and said propeller shaft and located on a horizontal plane extending between the axes of said output drive shaft and said propeller shaft,
(g) a third main mount positioned on said gearbox at a point intermediate said first and second main mounts and diametrically opposed to a point on the gearbox periphery adjacent said torque tube,
(h) a fourth main mount positioned on said turbine engine and providing flexibility of movement in the longitudinal direction to allow for thermal deflection in the system,
(i) and first and second auxiliary mounts on said turbine engine,
(j) the spring gradient characteristic of said auxiliary mounts relative to said main mounts being such as to provide a relatively soft mount characteristic in the normal deflection range and to provide a hard mount characteristic in deflection ranges of a magnitude representing a failure of one or more of said main mounts or of said torque tube,
(k) said first and second auxiliary mounts being so positioned on said engine so as to be able to substantially carry an excess loading on the engine and gearbox due to a failure of any one of the main mounts or the rigid interconnection between the engine and gearbox.

3. A shaft turbine engine and gearbox mounting arrangement comprising:
(a) a turbine engine,
(b) a gearbox,
(c) an output drive shaft extending from said turbine engine and drivingly connected to said gearbox,
(d) a torque tube enclosing said output drive shaft and rigidly interconnecting said turbine engine and said gearbox,
(e) a propeller shaft extending from the gearbox and offset vertically from the axis of said output drive shaft,
(f) first and second main mounts positioned on said gearbox on opposite sides of a vertical plane extending through the axes of said output drive shaft and said propeller shaft and located on a horizontal plane extending between the axes of said output drive shaft and said propeller shaft,
(g) a third main mount positioned on said gearbox at a point intermediate said first and second main mounts and diametrically opposed to a point on the gearbox periphery adjacent said torque tube,
(h) the elastic axis of said first, second, and third main mounts being positioned closely adjacent the axis of said propeller shaft,
(i) a fourth main mount positioned on said turbine engine and providing flexibility of movement in the longitudinal direction to allow for thermal deflection in the system,
(j) and first and second auxiliary mounts on said turbine engine,
(k) the spring gradient characteristic of said auxiliary mounts relative to said main mounts being such as to provide a relatively soft mount characteristic in the normal deflection range and to provide a hard mount characteristic in deflection ranges of a magnitude representing a failure of one or more of said main mounts or of said torque tube.

4. A shaft turbine engine and gearbox mounting arrangement comprising:
(a) a turbine engine,
(b) a gearbox,
(c) an output drive shaft extending from said turbine engine and drivingly connected to said gearbox,
(d) a torque tube enclosing said output drive shaft and rigidly interconnecting said turbine engine and said gearbox,
(e) a propeller shaft extending from the gearbox and offset vertically from the axis of said output drive shaft,
(f) first and second main mounts positioned on said gearbox on opposite sides of a vertical plane extending through the axes of said output drive shaft and said propeller shaft and located on a horizontal plane extending between the axes of said output drive shaft and said propeller shaft,
(g) a third main mount positioned on said gearbox at a point intermediate said first and second main mounts and diametrically opposed to a point on the gearbox periphery adjacent said torque tube,
(h) a fourth main mount positioned on said turbine engine and providing flexibility of movement in the longitudinal direction to allow for thermal deflection in the system,
(i) the elastic center of the system formed by said four main mounts being positioned closely adjacent the roll axis of said system,
(j) and first and second auxiliary mounts on said turbine engine,
(k) the spring gradient characteristic of said auxiliary mounts relative to said main mounts being such as to provide a relatively soft mount characteristic in the normal deflection range and to provide a hard mount characteristic in deflection ranges of a magnitude representing a failure of one or more of said main mounts or of said torque tube.

5. A shaft turbine engine and gear box mounting arrangement comprising:
(a) a turbine engine,
(b) a gearbox,
(c) an output drive shaft extending from said turbine engine and drivingly connected to said gearbox,
(d) substantially rigid structure interconnecting said turbine engine and said gearbox,
(e) a propeller shaft extending from the gearbox,
(f) first, second, and third main mounts on said gearbox circumferentially spaced about the gearbox periphery,
(g) a fourth main mount positioned on said turbine engine and providing flexibility of movement in the longitudinal direction to allow for thermal deflection in the system,
(h) and first and second auxiliary mounts on said turbine engine,
(i) the spring gradient characteristic of said auxiliary mounts relative to said main mounts being such as to provide a relatively soft mount characteristic in the normal deflection range and to provide a hard mount characteristic in deflection ranges of a magnitude representing a failure of one or more of said main mounts or of said substantially rigid interconnecting structure,
(j) said first and second auxiliary mounts being so positioned on said engine so as to be able to substantially carry an excess loading on he engine and gearbox due to a failure of any one of the main mounts or the rigid interconnection between the engine and gearbox.

(References on following page)

References Cited by the Examiner

UNITED STATES PATENTS

| | | | |
|---|---|---|---|
| 2,165,297 | 7/39 | Oliver | 248—5 |
| 2,393,141 | 1/46 | Butterfield | 248—5 |
| 2,632,997 | 3/53 | Howard | 60—39.32 X |
| 2,661,593 | 12/53 | Hughes | 60—39.31 |
| 2,684,819 | 7/54 | Leggett | 248—5 |
| 2,718,756 | 9/55 | McDowall | 60—39.31 |
| 3,020,004 | 2/62 | Blyth | 60—39.31 X |

References Cited by the Applicant

UNITED STATES PATENTS 2,539,960   1/51   Marchant.

SAMUEL LEVINE, *Primary Examiner.*

MARK NEWMAN, *Examiner.*